(12) United States Patent
Sloan, Jr. et al.

(10) Patent No.: US 10,931,524 B1
(45) Date of Patent: Feb. 23, 2021

(54) ACTIVE WIRELESS NETWORK MANAGEMENT TO ENSURE LIVE VOICE QUALITY

(71) Applicant: SOCIAL MICROPHONE, INC., Palo Alto, CA (US)

(72) Inventors: William W. Sloan, Jr., Goleta, CA (US); Kenneth Nathaniel Sherman, Santa Barbara, CA (US)

(*) Notice: Subject to any disclaimer, the term of this patent is extended or adjusted under 35 U.S.C. 154(b) by 0 days.

(21) Appl. No.: 16/823,312

(22) Filed: Mar. 18, 2020

(51) Int. Cl.
| | |
|---|---|
| *H04R 27/00* | (2006.01) |
| *H04L 12/24* | (2006.01) |
| *H04L 12/26* | (2006.01) |
| *H04L 29/06* | (2006.01) |

(52) U.S. Cl.
CPC ........ *H04L 41/0816* (2013.01); *H04L 43/087* (2013.01); *H04L 43/0829* (2013.01); *H04L 65/4069* (2013.01); *H04L 65/80* (2013.01); *H04R 27/00* (2013.01); *H04R 2227/009* (2013.01)

(58) Field of Classification Search
CPC ... H04L 65/80; H04L 65/403; H04L 65/4046; H04M 1/6066; H04W 84/02; H04R 27/00; H04R 29/007; H04R 2420/07
See application file for complete search history.

(56) References Cited

U.S. PATENT DOCUMENTS

2018/0234471 A1* 8/2018 Qian ................... H04L 61/2589

* cited by examiner

*Primary Examiner* — Kile O Blair
(74) *Attorney, Agent, or Firm* — Cardle Patent Law, Chtd.

(57) ABSTRACT

A system for managing moderator and audience audio captured by personal mobile devices and broadcast by a public address system in the same venue is disclosed. In various aspects, the system includes a wireless network hub. The wireless network hub transmits and receives wireless data from a plurality of personal mobile devices. A network manager component manages communications of the personal mobile devices with the wireless network hub. The network manager uses measured dynamic network parameters and determines conditions for maintaining voice stream quality according to configurable rules.

3 Claims, 7 Drawing Sheets

ACTIVE WIRELESS NETWORK MANAGEMENT TO ENSURE LIVE VOICE QUALITY

CROSS-REFERENCE TO RELATED APPLICATIONS

This application claims benefit of U.S. Provisional Patent Application No. 62/802,722 filed Feb. 8, 2019.

BACKGROUND OF THE INVENTION

Field of the Invention

The field of the invention is the management of wireless networks for the optimization of streaming media quality.

Background

Streaming live audio over wireless networks presents numerous problems for maintaining quality. Audio quality typically suffers from a range of problems that include latency, jitter and packet loss. In a scenario where the audio is broadcast over a public address system in the presence of the speaker whose mobile device has captured the audio, excessive noise and latency may make it difficult or impossible for the speaker to speak normally or continuously.

BRIEF SUMMARY OF THE INVENTION

A system for managing moderator and audience audio captured by personal mobile devices and broadcast by a public address system in the same venue is disclosed. In various aspects, the system includes a wireless network hub. The wireless network hub transmits and receives wireless data from a plurality of personal mobile devices. A network manager component manages communications of the personal mobile devices with the wireless network hub. The network manager uses measured dynamic network parameters and determines conditions for maintaining voice stream quality according to configurable rules. The dynamic network parameters may include device qualification(s), live measured audio quality of service metrics, unwanted packet streams. The network manager maintains audio quality for the personal mobile device signaled to broadcast over the public address system.

DETAILED DESCRIPTION OF THE INVENTION

Figure 1:
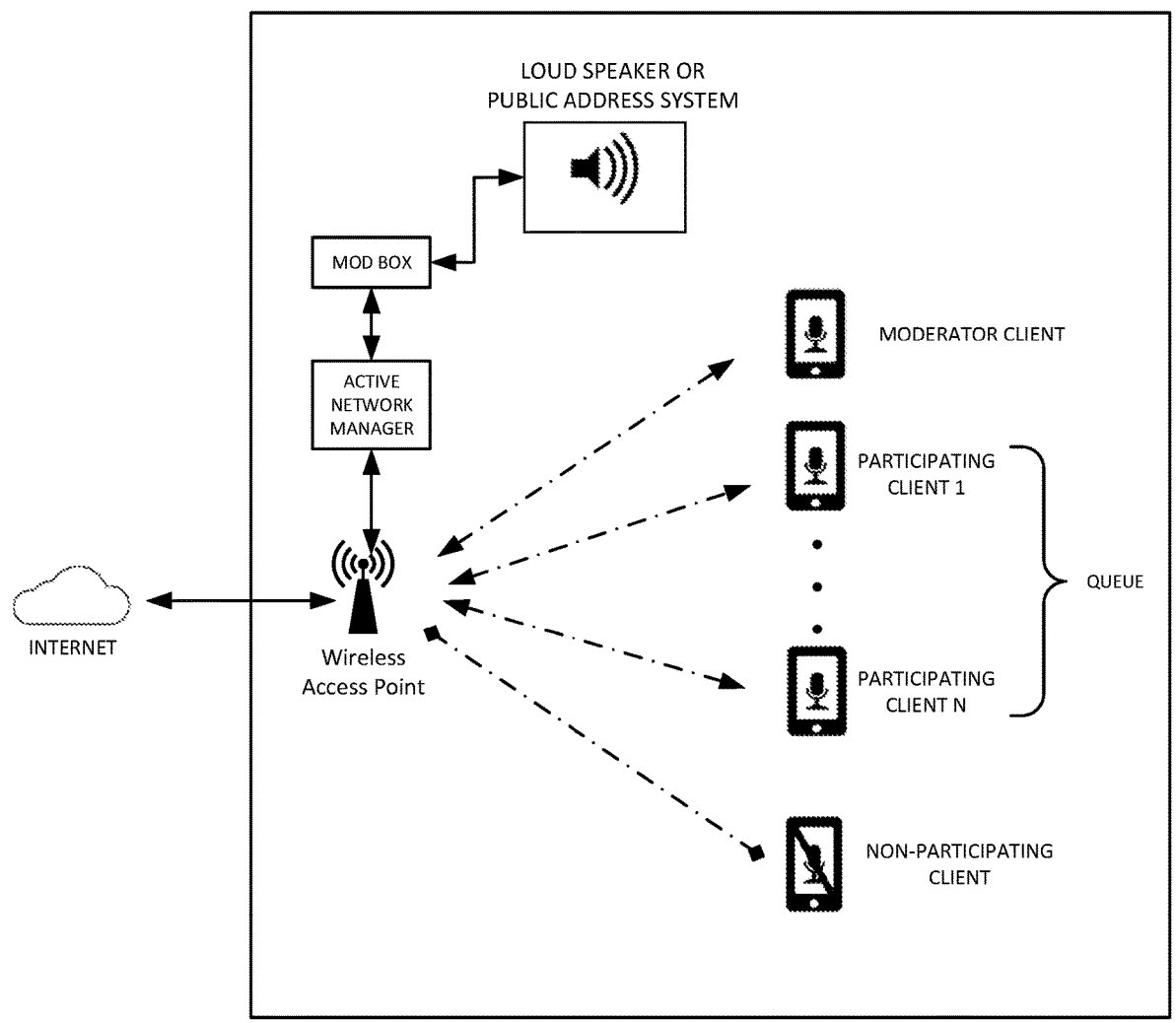
FIG. 1 depicts a component diagram for an exemplary embodiment.

Aspects of the disclosed system solve the problem of ensuring the live audio quality in a network, when audio from the person speaking (or singing) is captured and broadcast in the same room, or proximate audio location, streaming over the network. The disclosed system utilizes known processes of authentication and bandwidth throttling of network clients to manage the streaming audio such that quality is consistent and client users of the system may speak over a public address system using their personal mobile device microphone without experiencing intolerable levels of latency.

In various embodiments, performance specifications of personal client devices impact the performance of the local wireless networking device. An example of such a situation is when network performance is downgraded because one client device on the wireless network is using an outdated version of the Wi-Fi 802 11 wireless protocol. The presence and incorporation of the underperforming device on the network may cause the local wireless network to downgrade operation for all active clients to the protocol of the underperforming device. Thus, it is relevant to consider whether a client device is "qualified" by meeting acceptable minimum specifications as a pre-requisite for installing or operating the device application which allows the user to register the client device and utilize the disclosed system. In various embodiments, client device performance capabilities, such as available wireless networking hardware and software protocols may be detected and determined by polling the user's device from a network device, a browser application, or portal software for installing applications on the client device from a repository or other source. For example, the device's make, model, and serial number may be used to determine if the device meets minimum specifications.

The system component responsible for managing client devices is referred herein to as the Active Network Manager (ANM). Once a user client device has installed the disclosed broadcasting application, the device is allowed to stream audio captured on the client device for broadcast.

In various embodiments, a moderator client controls the order and ability of an audience member's device to capture streaming audio and transmit it for broadcast.

For known clients with the disclosed broadcasting application installed on their device, metrics of network performance such as "quality of service" QoS are detected and sent to the ANM to determine aspects of voice quality being sent from the client device. These metrics include latency, jitter and packet loss. Certain embodiments utilize continuous monitoring of these metrics to understand radio conditions and environmental changes and how they impact the wireless network environment. When the quality of captured audio drops below a defined metric of combination of metrics threshold, the system's ANM component may send a warning signal or message to the moderator's app which can prompt the moderator to stop the talker. In other embodiments, the user may be warned and the streaming signal interrupted by the ANM automatically.

Certain embodiments of the system utilize wireless networks including Wi-Fi networks. For most implementations of Wi-Fi networks a single access point is effectively capable of a fixed rate of data being sent to and received from the access point, or bandwidth. A limitation of most current wireless networks is that the network device bandwidth must be shared by all client devices. As a result, the quality of a captured and packetized voice signal transmitted in such Wi-Fi networks between a client and the access point is reduced as competing data transmitted to and from other clients takes away the available bandwidth from the voice signal. One solution for maintaining a high-quality voice signal in the presence of competing data is to utilize a data buffer. Data buffering is known, however, to increase signal latency.

In certain embodiments, the presently disclosed active network management is incorporated into the system disclosed in U.S. Pat. No. 8,144,893 by Sherman et al. and U.S. Pat. No. 9,538,011 by Sherman et al., the contents of which are incorporated herein in their entirety. The incorporated references disclose various aspects of a locally broadcast audio system wherein a moderator controls a queue of local client users whose own devices capture audio streams. Components of the incorporated references may for example allow a student or conference participant to use her cell phone or other personal communicator to speak over the public address system.

Use of a data buffer can provide a capability to transmit a high-quality voice signal, but the buffer has the shortcoming of introducing latency. Latency over a Wi-Fi network is normal for typical data uses. But latency can be problematic when, for example, captured audio is broadcast locally. In such an environment, such as the currently disclosed system, when a client user hears their own captured broadcast voice audio delayed by more than just 50-125 ms, their ability to continue speaking can suffer. Thus, the latency introduced by a data buffer may need to be mitigated.

Mitigation of latency caused by the data buffer may be accomplished in an embodiment of the system which uses the ANM to eliminate or reduce competing wireless network data traffic. Also, the selected audio stream signal quality is optimized by the Active Network Manager blocking or managing transmissions from other users of the wireless network while the active user's captured audio is being broadcast locally. When the active user is not "speaking", the other client devices in the room on the network are allowed to use the wireless network in a normal manner such as for Internet browsing.

In certain embodiments, de-authentication of client devices at the access point may be the chosen methodology for managing competing client devices in the room. Techniques employed by the Active Network Manager to manage clients include de-authenticating some of the devices from the Wi-Fi network and limiting the amount or type of data sent by others. De-authentication and throttling are terms known in the art for managing network traffic through a network device such as an access point. As described below, these processes are adapted in the present disclosure for actively managing network traffic to ensure the live voice quality for a speaker streaming live audio captured and broadcast in real time in the same room as the speaker.

The use of the word "client" or "client device" refers herein to all local user devices with wireless networking components such as wireless modems. In various embodiments, client devices are typically mobile smart phones, tablets, laptop computers, and desktop computers. In various embodiments, the utilized hardware component in the client device is a Wi-Fi modem.

In various embodiments, the ANM interrupts competing device data communication when a user of an active client device is "speaking", where a user's voice is being captured and broadcast live in the room through an access point or other wireless network gateway/hub while using a dedicated application on the device.

Generally, the Active Network Management system builds and continuously updates a database of all wireless clients present and accessible through, and to, a network device such as a Wi-Fi access point. The Active Network Management system processes data it receives from monitoring local devices and activity to individually control network access for all of such devices. These potential client devices are labelled as members of one or more of at least three device categories:

a. Users of client devices that are participating in the presentation. Participation includes a compatible device with a locally installed disclosed broadcasting application which has been registered as active with the Active Network Manager.

b. Users of client devices that are participating but using devices with misbehaving or signal abnormalities detected by the Active Network Manager. In certain configurations, the signal abnormalities are passed from an access point to the Active Network Manager which detects problems with the received streaming signal. Signal monitoring by the Active Network Manager is continuous and the status of a device can be changed by the Active Network Manager if the performance of the client device has degraded below a defined threshold.

c. Users of client devices that are not participating, where the device does not have the disclosed broadcasting application installed, or the device is not a logged in user of the local broadcast system. This category also includes what is typically referred to as a "rogue" client or uninvited client whether or not they are located inside the room.

One aspect of the Active Network Manager functionality is to rate-limit, or throttle, the outbound data connection between non-participating clients and the wireless network Gateway Hub, or Access Point.

Participating and non-participating clients should be de-authenticated or throttled only when the system is broadcasting a voice signal ("speaking") from a participating client. As soon as the voice ("speaking") stops, clients are permitted to transmit and receive data through the network device.

By continuously monitoring key performance parameters of wireless clients, the Active Network Manager can decide if a client's performance is too problematic for active participation. After a preconfigured back-off timer, clients can attempt to rejoin the presentation automatically or manually.

By rate-limiting traffic on the network, the Active Network Manager can perform network QoS (Quality of Service) in real-time to ensure proper voice performance.

The active network management system may be computer instructions executed as an internal component of the system such as a "ModBox" hardware device, or in another device connected to the ModBox and wireless network device. Functionality for the ModBox and active network manger may also be embedded into a suitably equipped wireless access point device, such as a so-called access point "container".

Typical system components of an exemplary embodiment include:
- A wireless network Gateway/Hub/Router/'Access Point which wirelessly connects participating clients and a moderator client to a ModBox and to the Active Network Manager. The ModBox itself has a wired connection to the public address (PA) XLR or microphone input.
- Participating clients registered and legitimately using the installed system app. In an exemplary installation, the app allows people in a conference to ask questions or make comments and have the audio delivered to the public address or loudspeaker utilizing the local wireless network.
- An Active Network Manager (ANM). The ANM monitors data quality and other metrics of the wireless network and its clients, and it de-authenticates, rate limits/throttles, or allows clients to transmit data based on monitored metrics and information.
- Embedded software processes for monitoring and managing the system and clients may be installed and executed on the ANM.

Connections between the wireless network, the Active Network Manager and the ModBox input to a public address (PA) system or a sound reinforcement system are utilized for operation. The PA system may be an off-the-shelf or legacy public address system which accepts input from the currently disclosed system.

The present disclosure provides for signal and client processing which includes:
- Classification of wireless clients based on their Wi-Fi modems;
- Registration of client devices to the room or event;
- Registration of client devices to the disclosed broadcasting application;
- Classification of client devices based on their network performance;
- Classification of client devices based on audio performance;
- Allowing or disallowing client devices to join the wireless network based on their network and audio performance classification;
- Temporarily removing client devices based on their performance classifications, specifically when network audio traffic is flowing from another client device through the network to the public address system;
- The removal of misbehaving client devices by the Active Network Manager and its related software processes.

As shown in FIG. 1, components of an exemplary system include: a wireless network and Hub/Gateway/Access point, participating clients, non-participating clients, a moderator client, a ModBox for processing audio, an Active Network Manager for managing wireless client communications and a loudspeaker/public address component.

As detailed above, client devices are categorized in some embodiments as: (1) clients that are taking part in the presentation by registering and signing into the disclosed broadcasting application; (2) client devices that are taking part in the presentation by registering and signing into the disclosed broadcasting application, but are misbehaving; and (3) client devices which are "rogue" or uninvited broadcasting client devices that are not taking part in the presentation.

The Active Network Manager continuously characterizes all the client devices by continuously sniffing all the network traffic and placing each client into one of the three aforementioned categories. The Active Network Manager may change the category of a client at any time.

Immediately before the client device's installed disclosed broadcasting application sends captured audio to the ModBox through the wireless access point, the Active Network Manager monitors and analyzes the wireless network for all traffic on the network.

By deauthenticating, throttling, or other means, the Active Network Manager removes any client devices from the network which are not registered both in the disclosed broadcasting application and the event/room/class, or are not processing and capturing audio according to technical requirements set for operation of the system.

Devices not meeting technical requirements may be determined by reference to a database of qualified devices; a database of qualified device specifications; information available from the device; and/or empirical results gathered from testing client devices for satisfactory performance with the disclosed broadcasting application.

Captured audio stream performance is sampled and tested by the Active Network Manager and ModBox according to quality and protocol standards set for the disclosed broadcasting system application and wireless environment. One such standard is to test for excessive use of UDP traffic by audio streaming clients when they are "speaking" in the disclosed broadcasting application by measuring the UDP traffic from the source device. In an exemplary embodiment, UDP traffic exceeding 1 Mbit/sec would be unacceptable for a client device when using the disclosed broadcasting application.

In a typical embodiment, when another qualified and active client device is detected as "speaking", those client devices which are otherwise qualified according to device specifications and measured performance may have their client device data traffic suppressed by the Active Network Manager. This data suppression may be performed by throttling the available data bandwidth for a client device, deauthenticating the client device from the local wireless network access point, locally disabling audio capture, disabling the device microphone or blocking data from an identified client device.

An active, registered client device steaming live audio may be continuously monitored for quality during broadcast. When the quality of the audio falls below a specified QoS threshold, the Active Network Manager may be configured to suppress data from that device for a limited period of time.

During those periods when no client device is actively capturing audio and sending it to be broadcast over the public address system, normal conditions for all devices and access points are restored.

In alternate embodiments, the Active Network Manager's operations may be performed by cloud based data processing integrated with, and connected to the local wireless network. In alternate embodiments, the disclosed system and Active Network Manager may be implemented with wireless networks and client devices that support embedded dynamic quality of service (QoS) metrics, and a network device may use on-board programmable and configurable components to perform client device suppression functions of the system.

In alternate embodiments, the wireless network may use uses alternate or next generation wireless protocols such as Bluetooth 5.0, wirelessHD, WiGig, 5G, and Wi-Fi 6. In alternate embodiments, multiple wireless access points may be controlled by a single Active Network Manager.

In alternate embodiments, the wireless network is either coordinated or managed by the Active Network Manager in the cloud and/or the ModBox in the cloud.

In alternate embodiments, cloud-based processing is used to separate the handling of control/meta data and voice data. Sending control and meta data in different formats and along different pathways, some wired and some wireless, may be balanced to improve audio processing quality. In one example, voice data is coded as UDP packets while control/meta data is coded as TCP/IP packets.

In various embodiments, the Active Network Manager utilizes configurable rules for managing network traffic from client devices.

FIG. 1 depicts an exemplary embodiment which identifies the relationship between various components of a system utilizing an Active Network Manager. In various embodiments, the wireless network is a Wi-Fi network and client devices are networked through an access point or network hub/gateway. In various embodiments, the audio public address system may be an available public address or sound reinforcement system for the venue where participant audio is captured from user client devices and broadcast live into the same room or venue.

Figure 2:
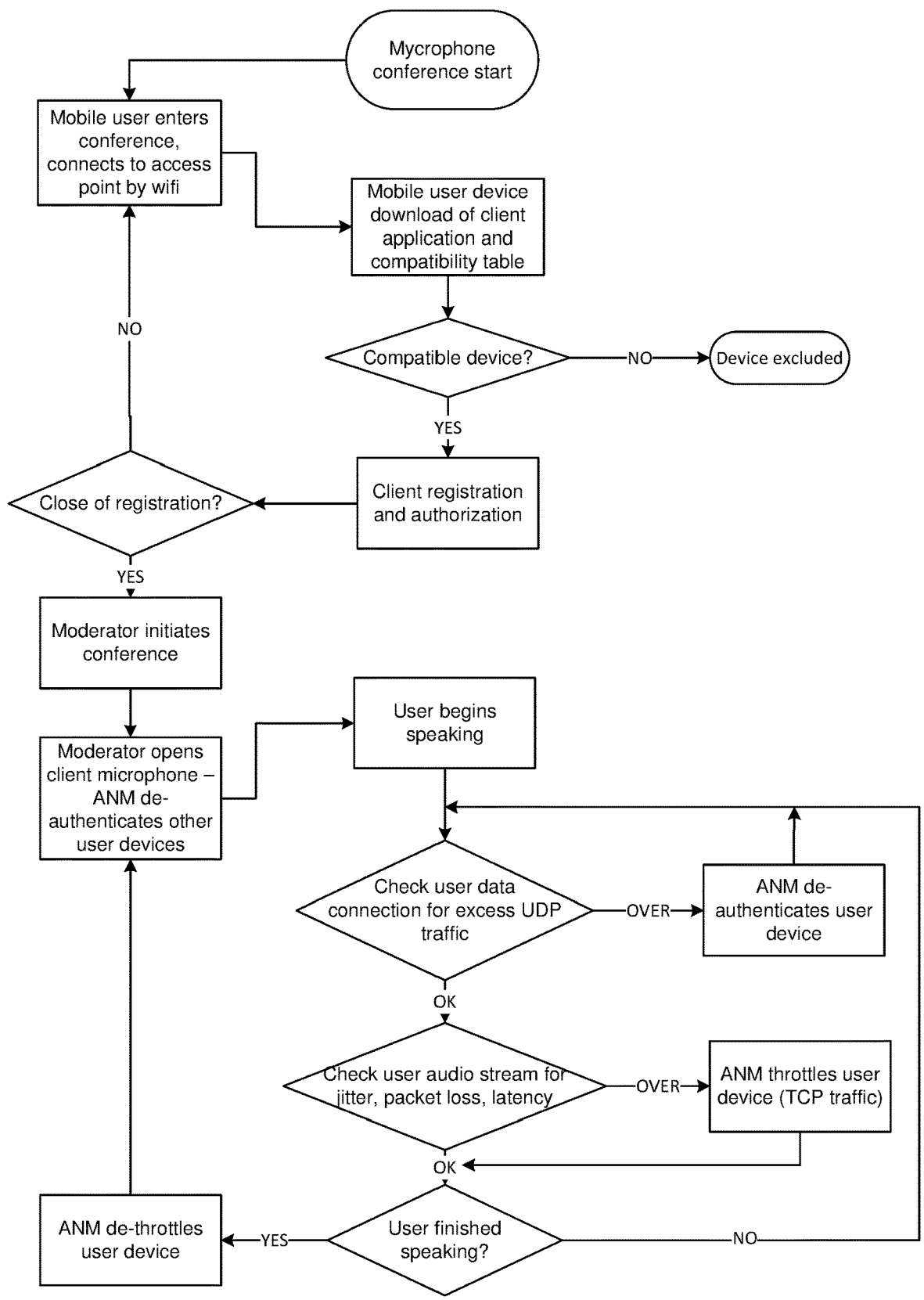
FIG. 2 depicts an overview flow chart of an exemplary system embodiment.

FIG. 2 shows one embodiment of typical system operation in the form of a flow chart, including individual device disclosed broadcasting application installation and registration, identification and qualification of participating clients, non-participating clients, "speaking" clients and a moderator client. Client devices are polled during operation for quality of service metrics and in some embodiments streaming captured audio from the device's microphone is suppressed during periods when another active device is capturing and streaming audio for local broadcasting through a public address system.

Figure 3:
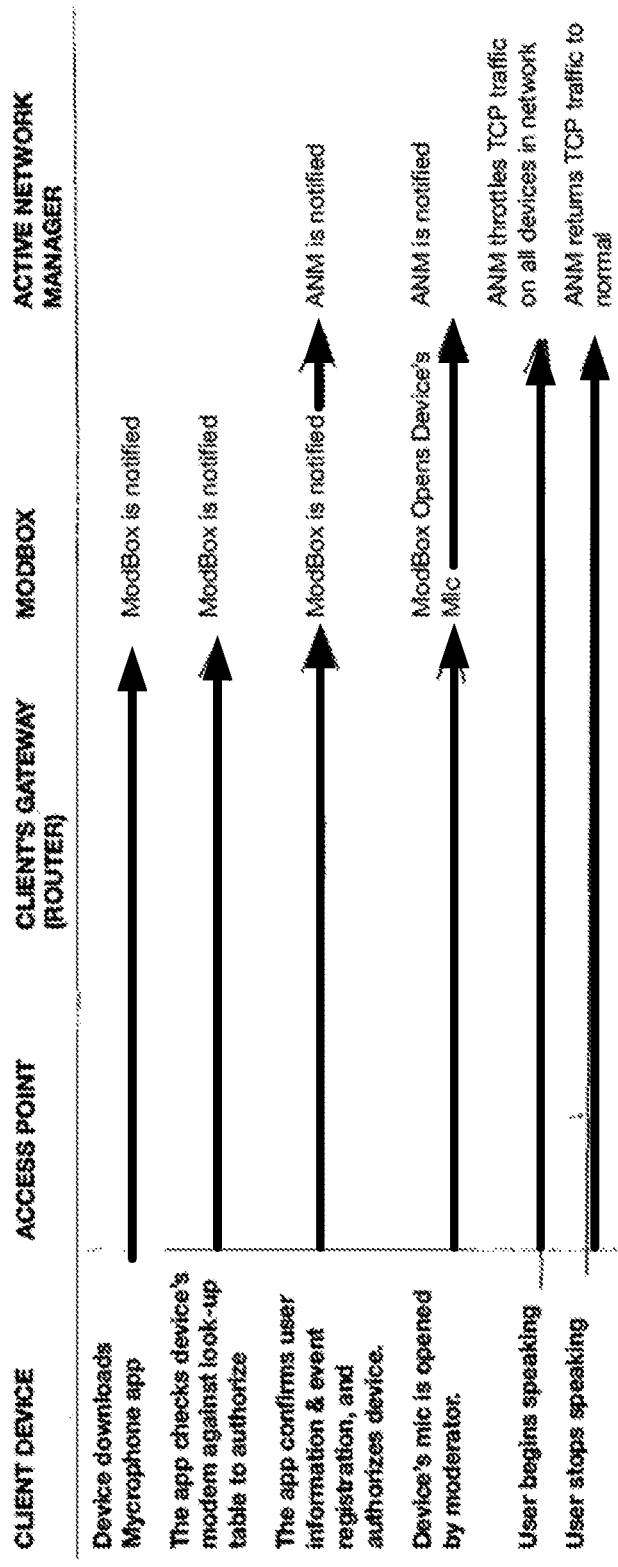
FIG. 3 depicts a swim lane flow diagram showing an exemplary system embodiment of active network management by the disclosed system during typical operation with a registered client device which is a qualified device and is maintaining minimum voice qualify when in "speaking" mode as it captures audio from the device's microphone for broadcast.

FIG. 3 is a swim lane diagram showing the interactions of various system components during the operation of a well-behaving, registered and active client device.

Figure 4:
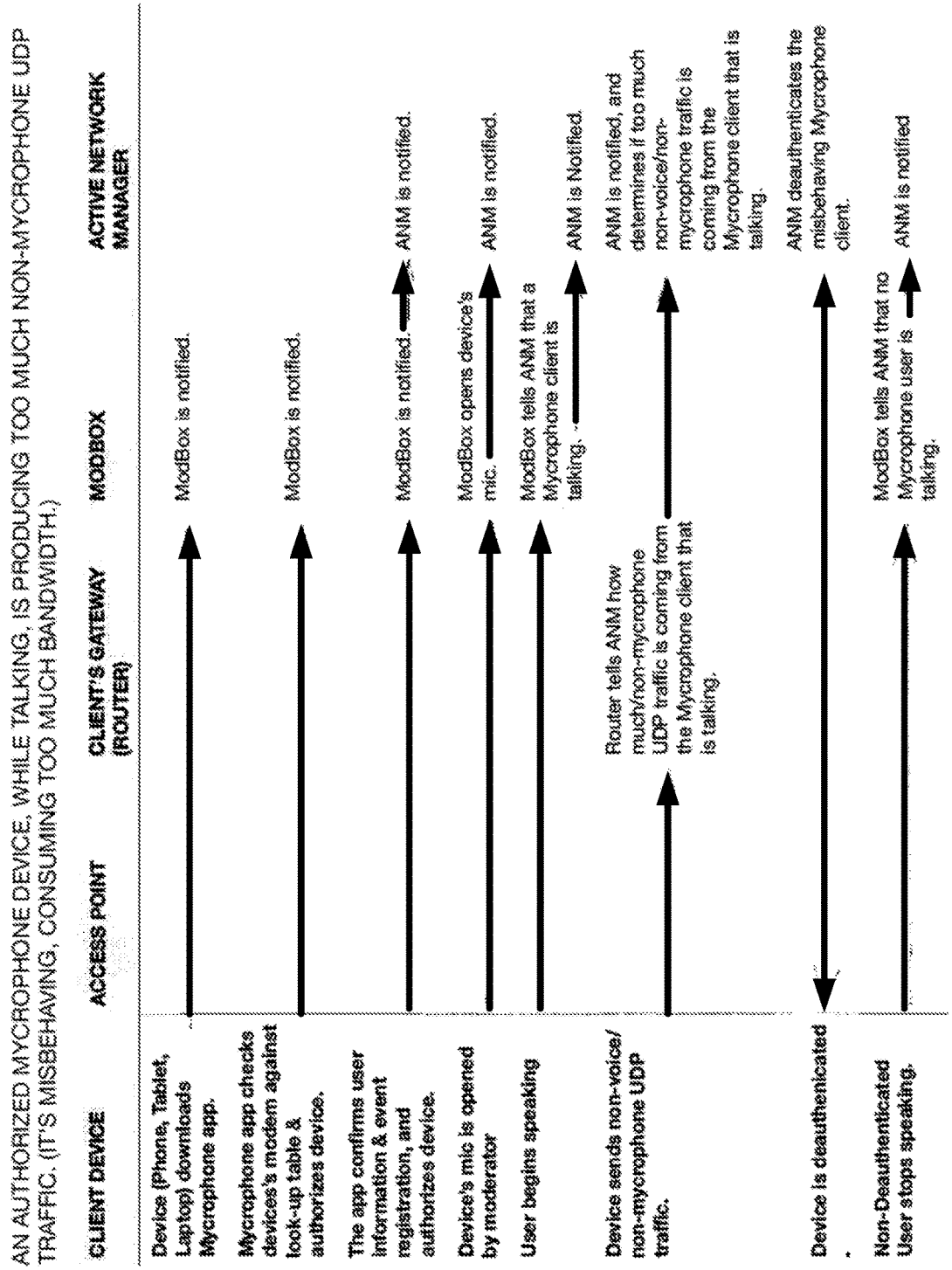
FIG. 4 and FIG. 5 depict swim lane flow diagrams showing an exemplary system embodiment of active network management by the disclosed system during typical operation with a registered and qualified client device which is transmitting undesirable Universal Datagram Protocol (UDP) data which forms no part of the relevant microphone session.

FIG. 4 is a swim lane diagram showing the interactions of various system components during the operation of a registered and active client device which is passing excessive amounts of non-relevant UDP traffic through the local wireless network.

Figure 5:
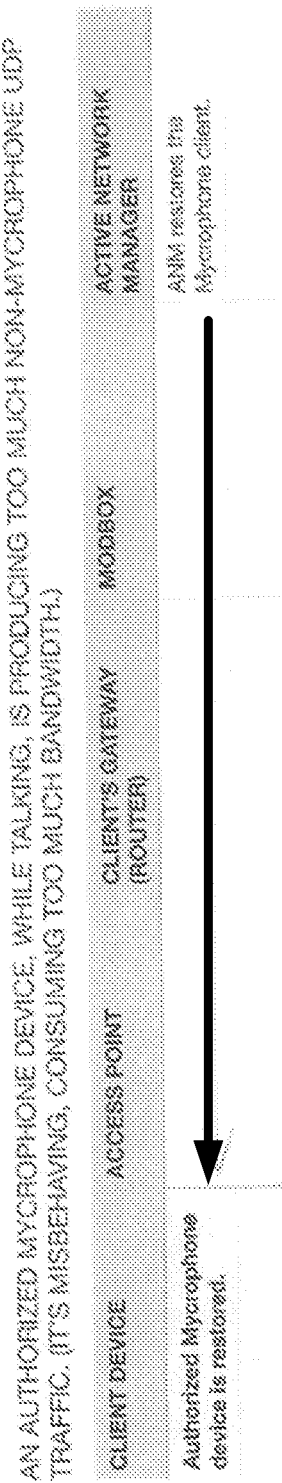

FIG. 5 is an alternate embodiment swim lane diagram showing the interactions of various system components during the operation of a registered and active client device which is passing excessive amounts of non-relevant UDP traffic through the local wireless network.

Figure 6:
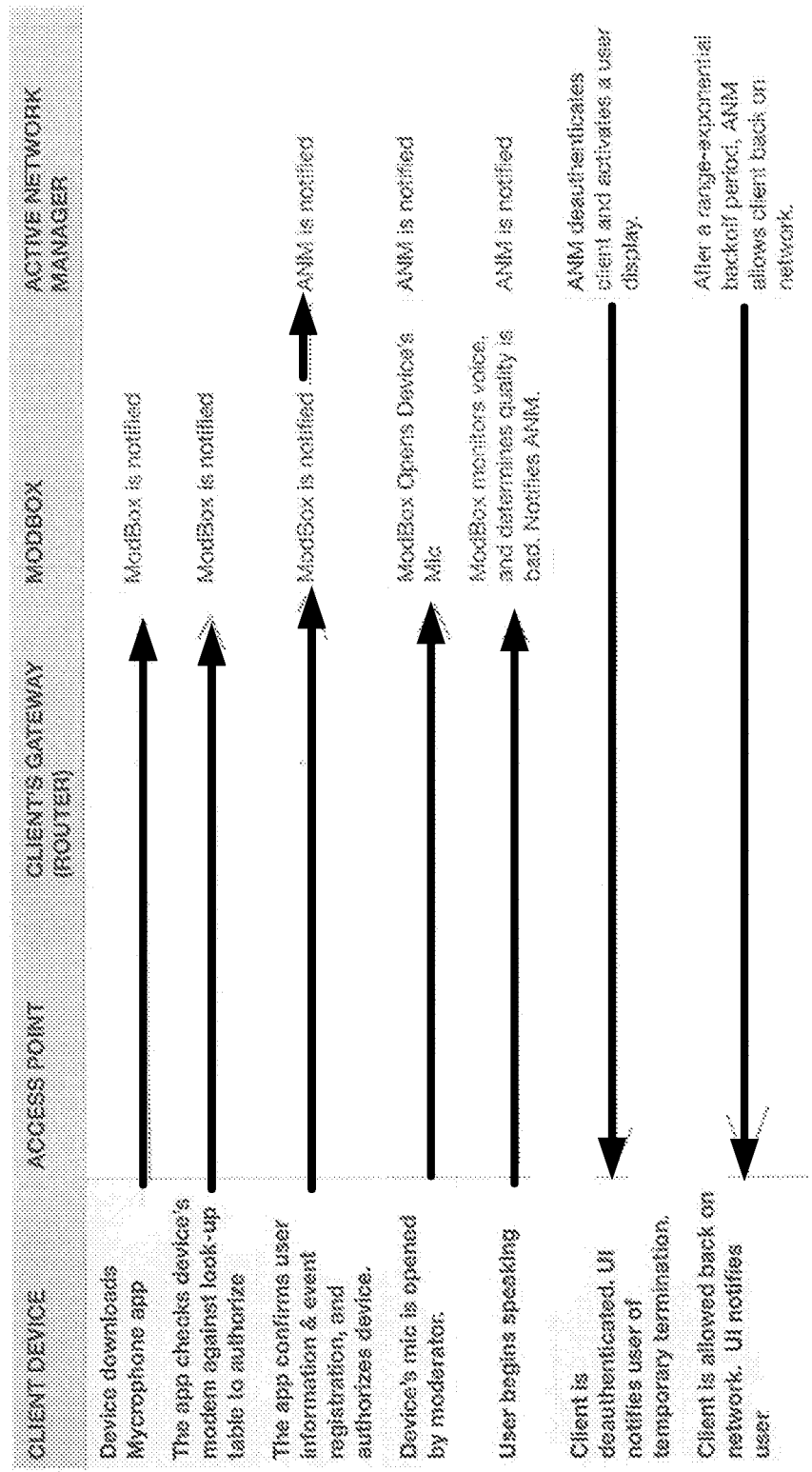
FIG. 6 depicts a swim lane flow diagram showing an exemplary system embodiment of active network management by the disclosed system during typical operation with a registered and qualified client device which is transmitting captured audio which does not meet minimum quality thresholds for at least one of latency, jitter, noise and packet loss. Device data may be suppressed for short to long intervals to maintain minimum voice quality when in "speaking" mode as it captures audio from the device's microphone for broadcast; and, FIG. 7 depicts a swim lane flow diagram showing an exemplary system embodiment of active network management by the disclosed system when a client device has no disclosed broadcasting application installed, the device may not be qualified, or the user and device are not registered with the broadcast system.

FIG. 6 is a swim lane diagram showing the interactions of various system components during the operation of a registered and active client device which is passing poor quality captured data from the device microphone through the local wireless network.

Figure 7:
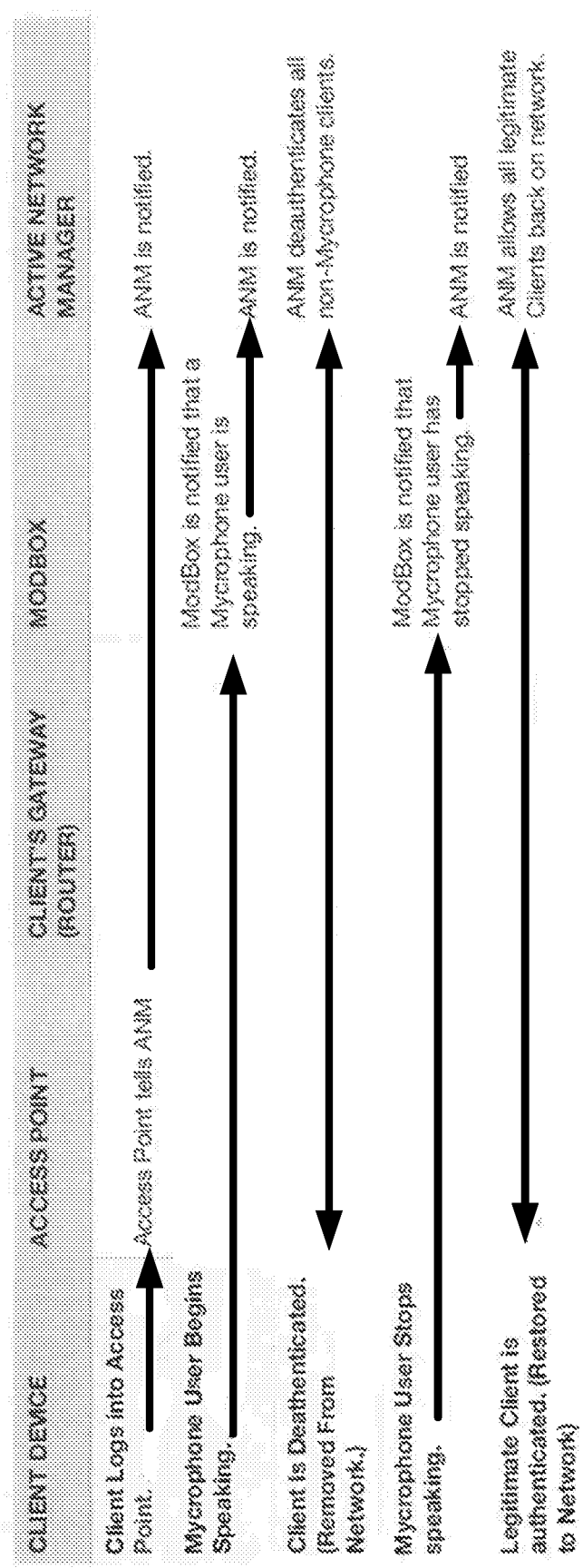

FIG. 7 is a swim lane diagram showing the interactions of various system components interacting with an unregistered or unqualified mobile client device.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code" Generally, program modules may include routines, programs, objects, components, logic, data structures, and so on that perform particular tasks or implement particular abstract data types. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus such as a digital signal processor (DSP), or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

We claim:

1. A system for managing moderator and audience audio captured by personal mobile devices and broadcast by a public address system in the same audio venue location comprising:
    a wireless network hub device wherein the wireless network hub device transmits and receives wireless data from a plurality of proximate mobile client devices,
    wherein at least one of the proximate mobile client devices is a moderator device,
    wherein at least one of the proximate mobile client devices not the moderator device is a participating device, wherein the participating device transmits captured audio from a participating device microphone when the participating device is signaled to speak by the moderator device;
    a modbox component, wherein the modbox component processes audio data streams from the at least one proximate mobile client devices to measure quality of service metrics, and wherein the modbox component outputs to a public address system an audio signal originating from the participating device;
    an active network manager component, wherein the active network manager component manages network access for participating devices, wherein the active network manager utilizes dynamic network parameters for managing network traffic comprising:
    device qualifications of the at least one proximate mobile client devices; and
    live measured audio quality of service metrics; unwanted packet streams; and wherein the active network manager uses measured dynamic network parameters and determines according to configurable rules conditions for maintaining voice stream quality; and
    whereby the active network manager maintains audio quality for the participating device signaled to speak by the moderator device by managing network access, broadcasts live audio captured by the participating device through the wireless network hub and modbox to the public address system to preserve minimum voice quality wherein a speaking user voice is captured by a participating client and transmitted in real time to the local wireless network device and processed by the modbox component and utilized by the active network manager component to control and authorize transmissions from proximate participating devices, non- participating devices and moderator devices to maintain qualify live voice audio for broadcast through the connected public address system.

2. The system of claim 1 wherein the live measured audio quality of service metrics comprise: latency, jitter, and packet loss.

3. The system of claim 1 wherein the unwanted packet streams comprise UDP packets not relevant to processing the live captured audio stream.

* * * * *

UNITED STATES PATENT AND TRADEMARK OFFICE
CERTIFICATE OF CORRECTION

PATENT NO. : 10,931,524 B1
APPLICATION NO. : 16/823312
DATED : February 23, 2021
INVENTOR(S) : William W. Sloan, Jr. and Kenneth Nathaniel Sherman Page 1 of 1

It is certified that error appears in the above-identified patent and that said Letters Patent is hereby corrected as shown below:

On the Title Page

After item (22) add:
(63) Related U.S. Application Data
Provisional application No. 62/802,722 filed Feb. 8, 2019.

Signed and Sealed this
Eighth Day of June, 2021

Drew Hirshfeld
*Performing the Functions and Duties of the
Under Secretary of Commerce for Intellectual Property and
Director of the United States Patent and Trademark Office*